(12) United States Patent
Sullivan et al.

(10) Patent No.: US 7,924,913 B2
(45) Date of Patent: Apr. 12, 2011

(54) NON-REALTIME DATA TRANSCODING OF MULTIMEDIA CONTENT

(75) Inventors: Gary J. Sullivan, Redmond, WA (US); Timothy E. Onders, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1496 days.

(21) Appl. No.: 11/227,467

(22) Filed: Sep. 15, 2005

(65) Prior Publication Data

US 2007/0061490 A1 Mar. 15, 2007

(51) Int. Cl.
- *H04B 1/66* (2006.01)
- *H04N 7/12* (2006.01)
- *H04N 11/02* (2006.01)
- *H04N 11/04* (2006.01)
- *G06F 15/16* (2006.01)

(52) U.S. Cl. .............. 375/240; 375/240.01; 709/247

(58) Field of Classification Search .............. None
See application file for complete search history.

(56) References Cited

U.S. PATENT DOCUMENTS

| | | | |
|---|---|---|---|
| 5,596,420 A * | 1/1997 | Daum | 386/110 |
| 5,893,920 A | 4/1999 | Shaheen et al. | |
| 5,987,126 A | 11/1999 | Okuyama et al. | |
| 6,052,735 A | 4/2000 | Ulrich et al. | |
| 6,189,146 B1 | 2/2001 | Misra et al. | |
| 6,219,652 B1 | 4/2001 | Carter et al. | |
| 6,324,544 B1 | 11/2001 | Alam et al. | |
| 6,327,652 B1 | 12/2001 | England et al. | |
| 6,393,434 B1 | 5/2002 | Huang et al. | |
| 6,407,680 B1 | 6/2002 | Lai et al. | |
| 6,463,445 B1 | 10/2002 | Suzuki et al. | |
| 6,493,758 B1 | 12/2002 | McLain | |
| 6,535,238 B1 * | 3/2003 | Kressin | 348/14.01 |
| 6,542,546 B1 | 4/2003 | Vetro et al. | |
| 6,611,358 B1 | 8/2003 | Narayanaswamy | |
| 6,757,517 B2 | 6/2004 | Chang | |
| 6,772,340 B1 | 8/2004 | Peinado et al. | |
| 6,775,655 B1 | 8/2004 | Peinado et al. | |
| 6,959,348 B1 | 10/2005 | Chan et al. | |
| 6,981,045 B1 | 12/2005 | Brooks | |
| 6,983,371 B1 | 1/2006 | Hurtado et al. | |
| 7,039,643 B2 | 5/2006 | Sena et al. | |
| 7,054,335 B2 | 5/2006 | Wee et al. | |
| 7,054,964 B2 | 5/2006 | Chan et al. | |
| 7,089,309 B2 | 8/2006 | Ramaley et al. | |
| 7,111,058 B1 | 9/2006 | Nguyen et al. | |
| 7,120,873 B2 | 10/2006 | Li | |

(Continued)

FOREIGN PATENT DOCUMENTS

CN 1287665 A1 3/2001

(Continued)

OTHER PUBLICATIONS

Heuer et al. (Adaptive Multimedia Messaging based on MPEG-7—the M3-Box, Proc. 2nd Int'l Symp on Mobile Multimedia Systems & Apps, Delft, 2000, pp. 6-13).*

(Continued)

*Primary Examiner* — Tom Y Lu
*Assistant Examiner* — Thomas A Conway
(74) *Attorney, Agent, or Firm* — Lee & Hayes, PLLC (57) ABSTRACT

Described herein are technologies directed towards non-real-time transcoding (e.g., compressing) a formatted multimedia datastream and doing so without consuming additional storage space or without making the data unavailable during the process.

20 Claims, 4 Drawing Sheets

U.S. PATENT DOCUMENTS

| | | |
|---|---|---|
| 7,133,925 B2 | 11/2006 | Mukherjee et al. |
| 7,143,354 B2 | 11/2006 | Li et al. |
| 7,155,475 B2 | 12/2006 | Agnoli et al. |
| 7,200,680 B2 | 4/2007 | Evans et al. |
| 7,203,620 B2 | 4/2007 | Li |
| 7,278,165 B2 | 10/2007 | Molaro |
| 7,290,699 B2 | 11/2007 | Reddy et al. |
| 7,382,879 B1 | 6/2008 | Miller |
| 7,421,024 B2 | 9/2008 | Castillo |
| 7,433,546 B2 | 10/2008 | Marriott et al. |
| 7,474,106 B2 | 1/2009 | Kanno |
| 7,475,106 B2 | 1/2009 | Agnoli et al. |
| 2001/0033619 A1 | 10/2001 | Hanamura et al. |
| 2002/0078075 A1 | 6/2002 | Colson et al. |
| 2002/0082939 A1 | 6/2002 | Clark et al. |
| 2003/0028488 A1 | 2/2003 | Mohammed et al. |
| 2003/0028643 A1 | 2/2003 | Jabri |
| 2003/0126608 A1 | 7/2003 | Safadi et al. |
| 2003/0158913 A1 | 8/2003 | Agnoli et al. |
| 2004/0193648 A1 | 9/2004 | Lai et al. |
| 2004/0196975 A1 | 10/2004 | Zhu et al. |
| 2005/0074063 A1* | 4/2005 | Nair et al. ............... 375/240.11 |
| 2005/0239434 A1 | 10/2005 | Marlowe |
| 2006/0008256 A1 | 1/2006 | Khedouri et al. |
| 2007/0058718 A1 | 3/2007 | Shen et al. |
| 2007/0153910 A1 | 7/2007 | Levett |

FOREIGN PATENT DOCUMENTS

| | | |
|---|---|---|
| CN | 1393783 A1 | 1/2003 |
| EP | 1320973 A2 | 6/2003 |
| RU | 2144269 C1 | 1/2000 |
| RU | 2163056 C2 | 2/2001 |
| WO | WO02/28006 | 4/2002 |
| WO | WO03/034313 | 4/2003 |
| WO | WO03/058508 | 7/2003 |
| WO | WO2004008407 A1 | 1/2004 |
| WO | WO2004/102459 | 11/2004 |

OTHER PUBLICATIONS

Nikkei Electronics, "Contents Transcoding Technology is Now Spotlighted as 'Lubricant' for Online Digital Distribution"; vol. 775, 2000, pp. 57-62.

"Context-based media Adaptation in Pervasive Computing" Internet May 31, 2001 Retrieved from url:http://www.mclab.uottawa.ca/papers/Ryan_paper.pdf retrieved on Aug. 19, 2004.

"Transcode" Online Nov. 29, 2002 retrieved from the Internet: url:http://www.theorie.physik.uni-goettingen.de/{ostreich/transcode/html/intro.html retrieved Aug. 16, 2004.

"SoX—Sound eXchange" Internet Dec. 12, 2003 retrieved from url:http://web.archive.org/web/20031212170807/http://sox.sourceforge.net retrieved on Aug. 16, 2004.

"Transcoding: Extending e-buisness to new environments" Internet Nov. 6, 2002 Retrieved from URL:http://researchweb.watson.ibm.com/journal/sj/401/britton.html retrieved Aug. 19, 2004.

Britton, "Transcoding: Extending E-Business to New Environments"; IBM Systems Journal, 2001, vol. 40, No. 1; pp. 153-178.

Chandra, et. al., "Application-Level Differentiated Multimedia Web Services Using Quality Aware Transcoding"; IEEE Journal on Selected Areas of Communications, Dec. 2000; vol. 18, No. 12; pp. 2544-2564.

"An Adaptive Web Content Delivery System" Internet May 21, 2000 Retrieved from the Internet URL:http://research.microsoft.com/asia/dload_files/g-mcomputing/MediaCom2/v5.pdf retrieved Aug. 20, 2004.

Chen, et al, "Mobile EE-an Interprise Mobile Service Platform"; Wireless Networks, 2003; vol. 9, No. 4; pp. 283-297.

Pervasive WEb Content Delivery with Efficient Data Reuse Internet Aug. 1, 2002 retrieved from url:http//2002.iwcw.org/papers/18500120.pdf retrieved on Aug. 16, 2004.

"The Multitasking Mindset Meets the Operating System" EDN Electrical Design News Cahners Publishing Co. Newton Massachusetts vol. 35 No. 20 Oct. 1, 1990.

Digital 5, "Media Server," printed Apr. 18, 2005, 2 pages.

DRM Watch Staff, "Microsoft Extends Windows Media DRM to Non-Windows Devices," DRM Watch, May 7, 2004, 2 pages.

Huang, et al., "A Frame-Based MPEG Characteristics Extraction Tool and Its Application in Video Transcoding"; IEEE Transaction on Consumer Electronics, Aug. 2002; vol. 48, No. 3; pp. 522-532.

Ihde, Steven C. et al., "Intermediary-based Transcoding Framework," printed Apr. 18, 2005, pp. 1-3.

Kassler et al., "Generic QOS Aware Media Stream Transcoding and Adaptation," Dept. of Distributed Systems, University of Ulm, Germany, printed Apr. 18, 2005, 10 pages.

Lee, Yui-Wah et al., "Gamma: A Content-Adaptation Server for Wireless Multimedia Applications," Bell Laboratories, Holmdel, NJ USA, printed Apr. 18, 2005, pp. 1-36.

Lee, et al., "Data Synchronization Protocol in Mobile Computing Environment Using SyncML"; HSNMC 2002 5th IEEE International Conference on High Speed Networks and Multimedia Communications, 2002; pp. 133-137.

LightSurf Technologies, "LightSurf Intelligent Media Optimization and Transcoding," printed Apr. 18, 2005, 1 page.

"Multimedia Content Adaptation for QoS Management over Heterogeneous Networks" Internet May 11, 2001 retrieved Aug. 18, 2004.

"Caching Strategies in Transcoding-enabled Proxy Systems for Streaming Media Distribution Networks" Internet Dec. 10, 2003 Retrieved from URL:http://www.hpl.hp.com/techreports/2003/HPL-2003-261.pdf retrieved on Aug. 19, 2004.

Singh, "PTC: Proxies that Transcode and Cache in Heterogeneous Web Client Environments"; Proceedings of the Third International Conference on Web Information Systems, 2002; pp. 11-20.

Heuer et al., "Adaptive Multimedia Messaging based on MPEG-7—The M3-Box", Proc. Second Int'l Symposium on Mobile Multimedia Systems & Applications (MMSA 2000), Delfit, The Netherlands, Nov. 9-10, 2000, pp. 6-13.

* cited by examiner

Fig. 1
(background)

NON-REALTIME DATA TRANSCODING OF MULTIMEDIA CONTENT

BACKGROUND

Many consumer electronics multimedia devices are capable of storing large amounts of digital multimedia content (e.g., audio and/or video). Examples of such devices include Digital Video Recorders (DVRs), portable digital video players, portable digital audio players, etc. These devices typically receive incoming data (e.g., digital multimedia content) having a defined and specified "format."

These consumer electronics multimedia devices receive formatted incoming data and store that data on a storage medium. Later, a user may experience (i.e., view and/or hear) the multimedia content contained in the stored formatted data. In some instances, the devices perform some intermediary processing of the incoming data before storing the data. The devices may perform this intermediary processing in order to re-format (e.g., compress or re-compress) the incoming data. This intermediate processing of converting multimedia content from one format to another is typically called "transcoding."

Traditional consumer electronics multimedia devices transcode the incoming data as the devices ingests the data. In other words, traditional devices transcode in "realtime." Herein, "realtime transcoding" means that the speed at which the incoming data is transcoded is at least equal to or greater than the speed at which the incoming data is received. Otherwise, the buffer for the incoming data will overflow because the device is unable to transcode and store data as quickly as the device actually gets the data. However, the realities of realtime transcoding often causes conventional devices to often exhibit a tradeoff between storage efficiency, device responsiveness (i.e., performance), and product cost.

Figure 1:
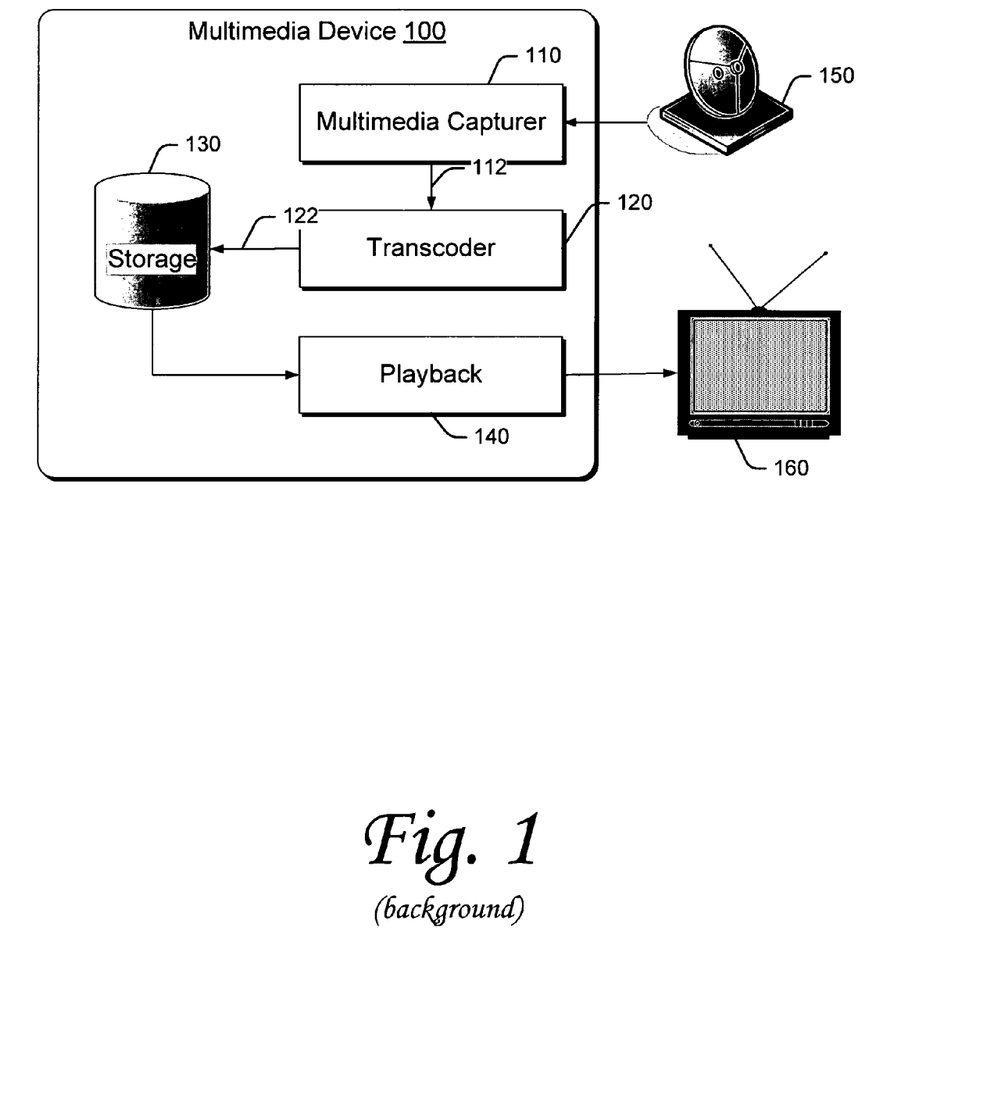
FIG. 1 illustrates conventional multimedia consumer electronics device, such as a digital video recorder (DVR).

FIG. 1 shows an example of conventional consumer electronics multimedia device 100, such as a DVR. The major relevant components of the device 100 include a multimedia data capturer 110, a transcoder 120, a storage medium 130, and a playback subsystem 140. The multimedia data capturer 110 receives incoming digital multimedia data (e.g., MPEG-2 formatted video data) from, for example, a satellite antenna ("dish") 150. As indicated by arrow 112, the capturer 110 transfers the incoming multimedia data to the transcoder 120 as the capturer receives the incoming multimedia data.

As the transcoder 120 receives the data from the capturer 110, the transcoder 120 transcodes the data and, as indicated by arrow 122, the transcoder sends the transcoded data to a storage medium 130. The realtime transcoding performed by the transcoder 120 converts the multimedia data into another format, reduces the bit rate of the data, further compresses the data, or the like. As desired, the playback subsystem 140 gets the stored multimedia data from the storage medium 130, decodes/decompresses the data, and plays it on a multimedia presenter 160, such as a television.

As depicted, device 100 is a relatively high cost device because it includes the necessary components and complexities for performing realtime transcoding. While doing realtime transcoding is efficient for storage, it generally requires significant computing power, complexity, and cost.

Alternatively, some, less-expensive, conventional devices forego the transcoding altogether or at least minimize the processing of the incoming data. These low-cost devices may simply store the multimedia content in its native or "raw" format. Alternatively, these low-cost devices perform some lightweight or incidental realtime processing on the incoming data. While this reduces the cost of other components which would be necessary to handle (e.g., re-format and compress) the incoming data in realtime, it is inefficient with regard to storage.

SUMMARY

Described herein are technologies directed towards non-realtime transcoding (e.g., compressing) a formatted multimedia datastream and doing so without consuming additional storage space or without making the data unavailable during the process.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same numbers are used throughout the drawings to reference like elements and features.

DETAILED DESCRIPTION

The following description sets forth techniques for non-realtime transcoding (e.g., compressing) a formatted multimedia datastream without consuming additional storage space or without making the data unavailable during the process. The transcoding is "non-realtime" because the transcoding of the formatted multimedia datastream is not performed concurrently or nearly concurrently with the ingestion of the datastream.

Exemplary Multimedia Device with Non-Realtime Transcoding System

Figure 2:
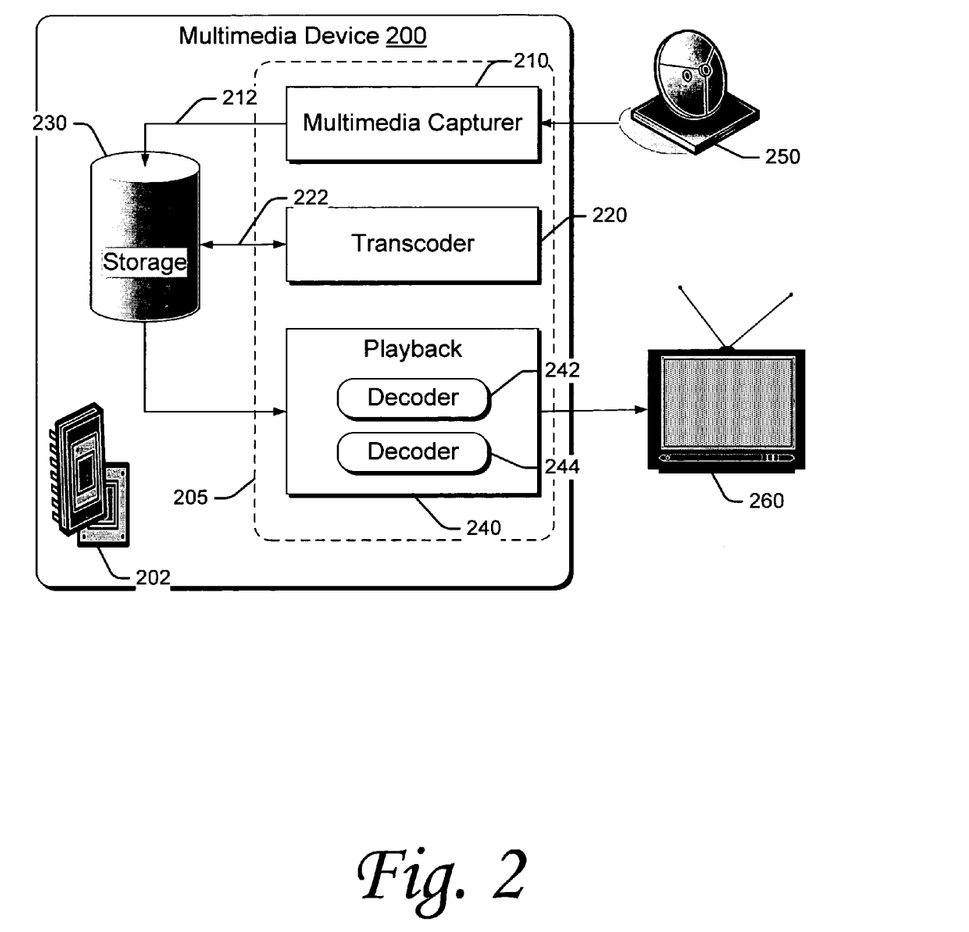
FIG. 2 illustrates an exemplary multimedia consumer electronics device in accordance with one or more implementations described herein.

FIG. 2 shows an example of a consumer electronics multimedia device 200, in accordance with one or more implementations described herein, with a non-realtime transcoding system 205. The depicted components of the device 200 include a multimedia data capturer 210, a transcoder 220, a storage medium 230, and a playback subsystem 240. The system 205 includes the capturer 210 and the transcoder 220 and may include the playback subsystem 240. If desirable, the device 200 also includes a processing core 202, which includes all of the fundamental processing components for a general- or special-purpose computing system.

These components (210, 220, and 240) may be implemented in hardware, software, firmware, or some combination thereof. Indeed, the system 205 may represent a working memory of the device 200. The working memory may be either volatile or non-volatile media. Also, it may be either removable or non-removable media. If the system 205 is the working memory of the device, then these components (210, 220, and 240) may be software modules.

Furthermore, the device 200 may be a special-purpose multimedia electronics device, such as a digital video recorder (DVR) or portable multimedia device. Alternatively, the device may be one or more of the following: special-purpose appliances, application-specific integrated circuits (ASICs), set top boxes, and programmable consumer electronics. Alternatively, the device may be implemented as one or more general-purpose computing systems. Examples of well known general-purpose computing systems that may be suitable for use include, but are not limited to, personal computers (PCs), server computers, hand-held or laptop devices, multiprocessor systems, personal digital assistants (PDA), wireless phones and equipment, minicomputers, mainframe computers, distributed computing environments that include any of the above systems or devices, and the like.

As shown in FIG. 2, the multimedia data capturer 210 receives incoming digital multimedia data from, for example, a satellite antenna ("dish") 250. This incoming digital multimedia data (e.g., MPEG-2 formatted video data) has a specific "format." Herein, a "format" of digital multimedia content includes its specific pre-established arrangement or organization of media data in computer-readable storage media. Also, many digital multimedia formats are associated with a specific compression/decompression ("codec") algorithm; thus, that format implies that the formatted multimedia data is compressed accordingly.

As indicated by arrow 212, the capturer 210 stores the incoming multimedia data onto the storage medium 230. So, unlike the conventional approaches, the device 200 does not perform heavyweight processing (e.g., recompression) of the incoming data in realtime. Instead, it stores the incoming data without any processing (or with only incidental or lightweight processing).

Later, when desirable, the transcoder 220 retrieves the stored multimedia data as indicated by arrow 222 from the storage medium 230 (such as a "hard drive" or "flash drive"). The transcoder 220 transcodes (e.g., compresses) the stored multimedia data. The device may decide to transcode during times when the device is idle or when the processing demands are low (i.e., "in the background").

Transcoding is a term that is well-known to those of ordinary skill in the art. As used herein, "transcoding" expressly includes, for example, conversion of multimedia data from one format to another, compression (or re-compression) of multimedia data, conversion of multimedia data in order to reduce the bit rate, or a similar action which changes the overall storage requirements of multimedia data.

The described actions being performed here by the capturer 210 and the transcoder 220 may be characterized as "non-realtime" transcoding of the multimedia data. That is because the device 200 is not transcoding the data as it receives it, but, rather, later and at its leisure. Typically, this non-realtime transcoding may be performed for the purpose of reducing the storage requirements of the multimedia data. To that end, the non-realtime transcoding may include compression (or re-compression) of the stored multimedia data or a change to a lower-bit-rate.

With this non-realtime transcoding, the device 200 uses storage more efficiently than conventional devices while still using less complex and powerful components (e.g., hardware) that would be necessary for realtime transcoding. Less complex and less powerful components means that the components used are less expensive than those used by a realtime transcoding device. Furthermore, less complex and less powerful components also means that the device consumes less power than does a realtime transcoding device. Further still, there is less of a need for heat dissipation with non-realtime transcoding device than with a realtime transcoding device.

One or more implementations of the non-realtime transcoding system 205, described herein, perform transcoding on an existing multimedia datastream (e.g., converting formats, such as from MPEG-2 to VC-1, or a different bit rate) without consuming additional storage space or making the data unavailable during the process.

In multimedia datastream formats (such as compressed video bit streams or stream multiplexes), specific stream features divide the datastream into individually decodable units (IDUs). These specific stream features may include, for example, start codes, synchronization patterns, I-frames, packet boundaries or other random access points in the datastream. In some instances, the IDUs may be called frames, group of pictures (GOPs), stream segments, or sequences. Although these stream segments are referred to herein with the word "independent," in some instances, limited dependencies may exist across the boundaries of such units (such as "B-picture" dependencies in "open-GOP" usage of MPEG-2 video) while enabling the basic necessary functionality of providing some form of "random access point" at which the decoding process can begin without use of the prior segments of the datastream. Therefore, IDUs expressly include the so-called "open" GOPs which are characterized by nominally overlapping dependency.

The non-realtime transcoding system 205 utilizes the independent nature of these data stream structures to modify one or more IDUs in the datastream without affecting the decodability (e.g., usability and playability) of the entire datastream.

Figure 3:
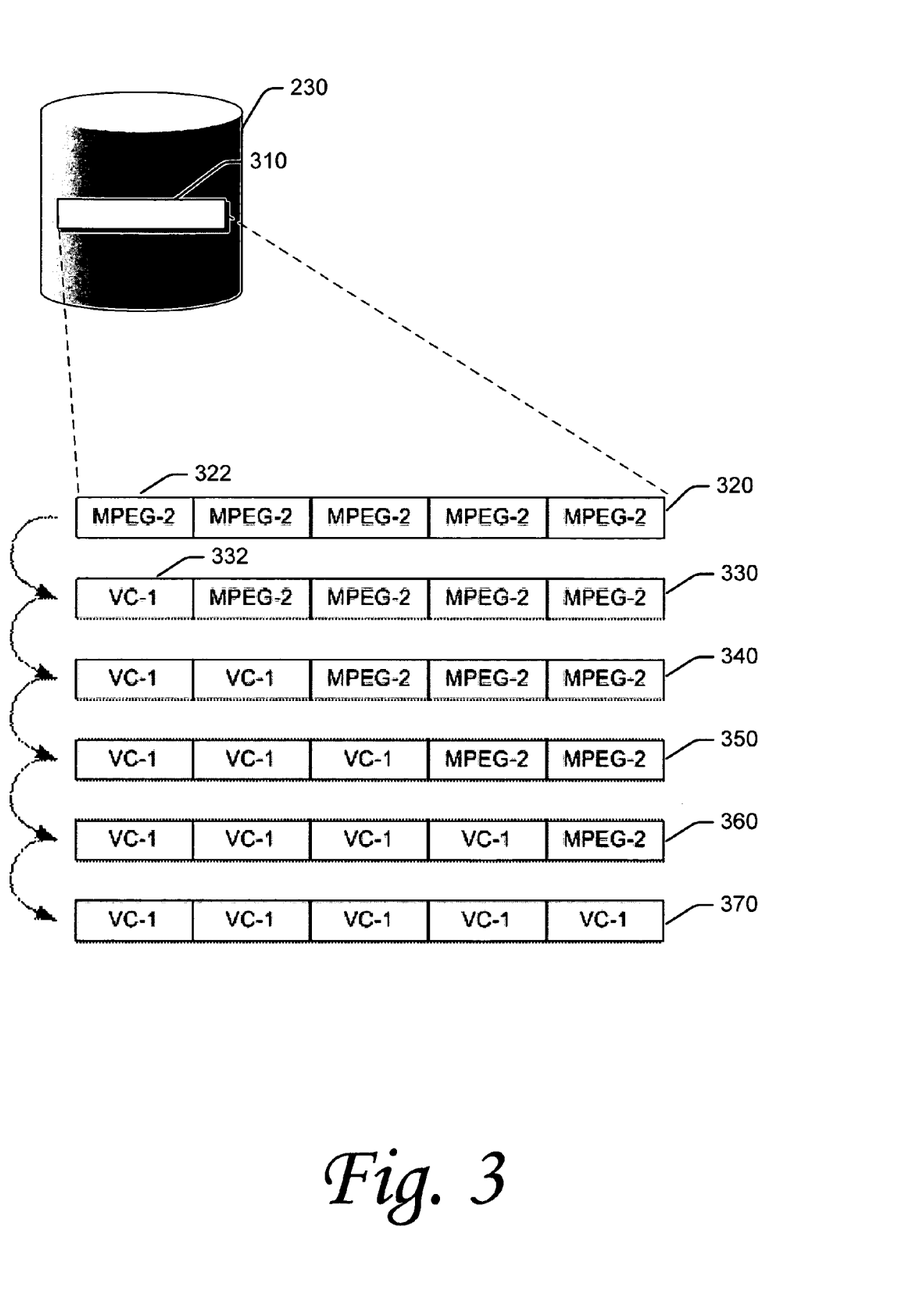
FIG. 3 illustrates the operation of one or more implementations described herein.

FIG. 3 shows operation of an exemplary DVR utilizing one of the implementations of the non-realtime transcoding system 205 described herein. The DVR captures an MPEG-2 formatted satellite signal directly to a storage device (such as storage medium 230) at the broadcast's original bit rate (e.g., 6 Mbps) to the datastream 310. As it is now stored, the datastream 310 is, for example, a file containing formatted multimedia content. For the sake of simplicity, the illustrated datastream 310 is depicted with five IDUs in a close-up view at 320. Each IDU at 320 is shown as individual, but contiguous, sequence of boxes, each being labeled "MPEG-2." The labels indicate the format of that labeled IDU. So, in the illustrated example each IDU in the datastream (represented at 320) is in the well-known MPEG-2 format.

To conserve disk space, the subject DVR transcodes, at its leisure, the captured MPEG-2 formatted datastream to a lower bit rate (such as that of VC-1) one IDU at a time. As shown by comparing box 322 of datastream representation 320 with box 332 of representation 330, the "MPEG-2" labeled IDU 322 is replaced by the new transcoded version of it, which is IDU 332 labeled "VC-1." The old MPEG-2 data of the now transcoded IDU is discarded because it is not necessary. Also, the DVR may, in some embodiments, leave a sequence-change indicator in the file at the current point of the transition between the use of two distinct data formats for the IDUs in the datastream. The sequence of transcoding each IDU in the datastream and then replacing the transcoded IDUs is shown by a sequence of modified datastreams 330-370 in FIG. 3.

Alternatively, the storage data within each IDU may contain sufficient header information to indicate the format of its content. In some uses in which the transcoding process consists only of a change of fidelity without a change of basic format (e.g., transcoding from MPEG-2 video format to lower-fidelity MPEG-2 format by employing the use of an increased value of the quantization step size fidelity control parameter), no format type indication may be needed as the format type has not changed.

Furthermore, the IDU structure can also be changed by the transcoding process if desired, for example, by mapping more than one input IDU to a single output IDU (for example, to reduce disk space by less frequent use of "I pictures" in MPEG-2 video), although this is not illustrated in the figure.

The allocation of storage media capacity to IDUs can be achieved by various means. For example, each IDU can be stored in a separate file on a hard disk, so that the transcoding process can replace IDUs individually without affecting other IDUs. Alternatively, each IDU can be stored in an integer number of fixed-size data sectors on the storage medium, each of which contains a "linked list" pointer to the next sector in the datastream. In such a case, each IDU could be aligned to the start of a new segment boundary (for example by padding all remaining data in the previous segment with zero-valued data that is understood as padding data to be ignored by the decoding process). In such a case, the replacement of an IDU in the datastream could be accomplished by changing the pointer in the last sector of the preceding IDU that directs the decoding process to the location of the next IDU and setting the pointer in the last sector of the new IDU data to the location of the first sector of the subsequent not-yet-replaced IDU. A broad variety of other storage methods are also feasible.

In the case of overlapping dependencies between IDUs, some allowance or adjustment can be made to the decoding process to account and compensate for the dependencies. For example, in the case of "open-GOP" MPEG-2 encoding (a term well known in the art), the transcoding process could be designed to allow a frame of the replaced IDU to be used as a substitute for the replaced frame that would have been used in the decoding process of subsequent MPEG-2 B pictures. Alternatively, a "broken link GOP" flag for the subsequent IDU (a term well known in the art in the context of MPEG-2 video usage) could be set to indicate that some B pictures of the subsequent IDU should not be decoded. A variety of other alternative means for compensating for dependencies that cross IDU boundaries could alternatively be employed.

When the user wishes to experience the multimedia content of the datastream, the playback subsystem 240 gets the stored multimedia data from the storage medium 230, decodes/decompresses the data, and plays the data on a multimedia presenter 260, such as a television. With one or more implementations described herein, the playback subsystem 240 may playback the multimedia data as the transcoder is trancoding the data.

In the conventional approaches, the entire datastream (e.g., file) of a multimedia entity (e.g., a movie or song) is unavailable while the datastream is being transcoded. However, since the non-realtime transcoding system 205 transcodes one IDU at a time, the playback subsystem may play all of the other IDUs of the datastream and may also play the not-yet-replaced copy or may play the copy used in the transcoding process for the IDU currently being processed. Furthermore, this new approach produces a less fragmented storage space than the conventional process where the whole datastream is replaced by a whole transcoded datastream.

Further still, this new approach uses little or no additional storage space to perform the transcoding. The conventional approaches required storage space for both the original source datastream (e.g., file) and the new target datastream. So, the storage medium needs available unused storage space for this temporary storage. However, with the new approach does not require such extra unused space. This is because the new approach works at the level of the IDU of the datastream rather than the datastream as a whole. It replaces each IDU after it is processed.

If the original format and the transcoded formats of the IDUs are different, then the playback subsystem 240 will probably employ two or more decoders/decompressors in order to be able to play both formats while a datastream is being transcoded. The playback subsystem 240 shown in FIG. 2 includes two decoders/decompressors 242 and 244.

When the playback subsystem 240 encounters a sequence change point (or identifies a differently formatted IDU) then it transitions from one decoder to the other. This allows for the media file to be fully usable during the transcoding process and making optimal use of the available storage space.

During playback, the transition between formats in the datastream may result in momentary glitchy playback because of several reasons. One of those reasons involves overlapping interdepenancy of GOPs. Here are a few examples of the many ways to address this potentially glitchy playback for transitions:

Hold the display of already decoded frames for a moment during the transition;

Store a temporary buffer of commonly formatted frames around the transition point and utilize them for the presentation of the transition points;

Have dependent frame of a new format utilize the already decoded frames of an old format.

Methodological Implementation

Figure 4:
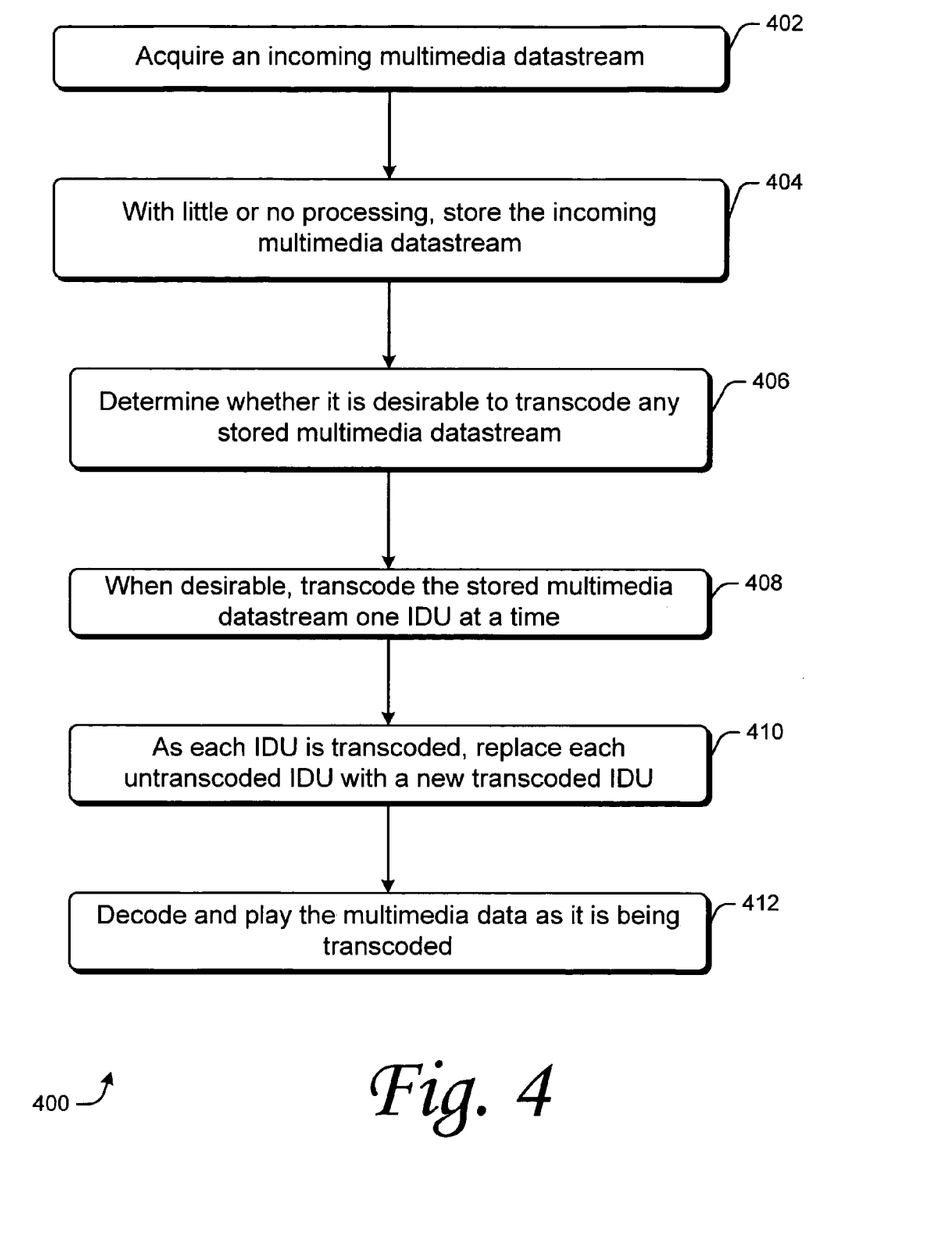
FIG. 4 illustrates a flow diagram showing another methodological implementation described herein.

FIG. 4 shows method 400 for non-realtime transcoding. This method 400 is performed by the one or more of the various components as depicted in FIG. 2. Furthermore, this method 400 may be performed in software, hardware, firmware, or a combination thereof.

For ease of understanding, this method is delineated as separate steps represented as independent blocks in FIG. 4; however, these separately delineated steps should not be construed as necessarily order dependent in their performance. Additionally, for discussion purposes, the method 400 is described with reference to FIG. 2. Also for discussion purposes, particular components are indicated as performing particular functions; however, other components (or combinations of components) may perform the particular functions.

At 402 of FIG. 4, the multimedia data capturer 210 acquires an incoming multimedia datastream.

At 404, with little or no processing, the incoming multimedia datastream is stored in the storage medium 230.

At 406, a determination is made regarding whether it is desirable to transcode (e.g., compress) some stored multimedia datastream. This determination may occur when the device is idle or performing other functions with low processing needs. It may be done in response to a user direction. In some instances, there may be no determination made, but rather an automatic reaction to transcode the captured multimedia datastream.

At 408, the transcoder 220 transcodes (e.g., compresses) each IDU of the multimedia datastream.

At 410, the transcoder 220 replaces each old IDU with its associated just-transcoded IDU. The transcoder may also leave a sequence-change indicator in the file at the current point of processing. Alternatively, the IDU may provide a mechanism for identifying its format or other characteristics.

At 412, the playback subsystem 240 decodes/decompresses the multimedia datastream and plays it. It may do this while the multimedia datastream is being transcoded.

Conclusion

Digital multimedia content typically exists in a specified "format." Herein, a "format" of digital multimedia content includes its specific pre-established arrangement or organization of multimedia data in computer-readable storage media. In addition, multimedia data is typically compressed (and later decompressed) using a specific compression/decompression ("codec") algorithm. Because a multimedia format and its specified codec are often closely associated, the line between them is often blurred. Herein, unless the context indicates otherwise, references to the "format" of digital multimedia content includes the codec associated with compressing/decompressing the content, as well as the content's specific pre-established arrangement or organization of multimedia data in computer-readable storage media.

The techniques, described herein, may be implemented in many ways, including (but not limited to) program modules, software, general- and special-purpose computing systems, network servers and equipment, dedicated electronics and hardware, firmware, as part of one or more computer networks, or any combination thereof.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A system comprising:
   a multimedia datastream capturer to acquire and store a formatted multimedia datastream in a computer-readable storage media;
   a transcoder to transcode the formatted multimedia datastream into a transcoded multimedia datastream following the storage of the formatted multimedia datastream in the computer-readable storage media;
   a multimedia player to at least playback a portion of the formatted multimedia data stream and a portion of the transcoded multimedia datastream during transcoding; and
   a buffer to store at least one frame of the portion of the formatted multimedia data stream around a playback transition point between the portion of the formatted multimedia data stream and the portion of the transcoded multimedia datastream,
   wherein the multimedia player is to further playback the at least one frame in the portion of the formatted multimedia datastream in place of at least one corresponding frame in the portion of the transcoded multimedia data stream at the playback transition point.

2. A system as recited in claim 1, wherein the transcoding performed by the transcoder is characterized by compressing the formatted multimedia datastream.

3. A system as recited in claim 1, wherein the transcoding performed by the transcoder is characterized by changing the format of the formatted multimedia datastream.

4. A system as recited in claim 1, wherein the transcoder is to initiate its transcoding while the system is idle or otherwise has low performance demands.

5. A system as recited in claim 1, wherein the transcoder is to transcode the formatted multimedia datastream without using additional storage space than used by the formatted multimedia datastream when stored before transcoding.

6. A system as recited in claim 1, wherein the formatted multimedia datastream is partitioned into a sequence of individually decodable units (IDUs), wherein a change in one IDU in the datastream does not affect usability of the remaining IDUs in the datastream.

7. A system as recited in claim 1, wherein:
   the formatted multimedia datastream is partitioned into a sequence of individually decodable units (IDUs), wherein a change in one IDU in the datastream does not affect usability of the other IDUs in the datastream;
   the transcoding performed by the transcoder is characterized by transcoding each IDU one at a time, until all of the IDUs of the datastream are transcoded.

8. A system as recited in claim 1, wherein:
   the formatted multimedia datastream is partitioned into a sequence of individually decodable units (IDUs), wherein a change in one IDU in the datastream does not affect usability of the remaining IDUs in the datastream;
   the transcoding performed by the transcoder is characterized by:
      transcoding each IDU one at a time, until all of the IDUs of the datastream are transcoded; and
      replacing each IDU with its corresponding transcoded IDU.

9. A system as recited in claim 1, wherein the formatted multimedia datastream is selected from a group consisting of digital multimedia files, digital audio files, and digital video files.

10. A system as recited in claim 1, wherein the formatted multimedia datastream is partitioned into a sequence of individually decodable units (IDUs), wherein a change in one IDU in the datastream does not affect usability of the remaining IDUs in the datastream and wherein the multimedia player is further to decode multiple differing formats of IDUs of the formatted multimedia datastream and play back the datastream with the decoded IDUs.

11. A system as recited in claim 10, wherein the differing formats of IDUs of the datastream differ in how each IDU of a particular format is compressed from how other IDUs of other formats are compressed.

12. One or more computer-readable memory having computer-executable instructions that, when executed by a computer, perform operations comprising:
   acquiring a formatted multimedia datastream;
   storing the formatted multimedia datastream on a computer-readable storage medium;
   transcoding at least a portion of the formatted multimedia datastream into a portion of transcoded multimedia datastream following the storing of the formatted multimedia datastream;
   buffering at least one frame of the formatted multimedia datastream at a transition point between the formatted multimedia datastream and the transcoded multimedia datastream; and
   presenting the at least one frame of the formatted multimedia data stream in place of at least one corresponding frame of the transcoded multimedia datastream when a datastream playback switches from the formatted multimedia stream to the transcoded multimedia datastream at the transition point.

13. One or more computer-readable memory of claim 12, wherein the datastream playback begins during the transcoding of the multimedia datastream.

14. One or more computer-readable memory of claim 12, wherein the transcoding operation includes replacing each individually decodable unit (IDU) in the stored multimedia datastream with a corresponding transcoded IDU.

15. One or more computer-readable memory of claim 12, wherein:
   the multimedia datastream is partitioned into a sequence of individually decodable units (IDUs), wherein a change in one IDU in the datastream does not affect usability of the other IDUs in the datastream; and the transcoding operation is characterized by transcoding one or more individual IDUs so that the transcoding of any particular IDU does not affect playability of the other IDUs in the datastream.

16. One or more computer-readable memory of claim 12, wherein:

the multimedia datastream is partitioned into a sequence of individually decodable units (IDUs), wherein a change in one IDU in the datastream does not affect usability of the other IDUs in the datastream; and the transcoding operation is characterized by replacing one or more individual IDUs with its corresponding transcoded IDUs.

17. One or more computer-readable memory of claim 12, wherein the multimedia datastream is partitioned into a sequence of individually decodable units (IDUs), wherein a change in one IDU in the datastream does not affect usability of the remaining IDUs in the datastream and wherein the datastream has IDUs of differing formats, the operations further comprise decoding the multiple differing formats of the IDUs before performing the playing operation.

18. A method comprising:

acquiring a formatted multimedia datastream that is partitioned into a sequence of individually decodable units (IDUs), wherein a change in one IDU in the datastream does not affect usability of the other IDUs in the datastream;

storing each of the IDUs into a corresponding data sector of a computer-readable storage medium, each data sector having a pointer to a downstream data sector;

transcoding an IDU of the stored multimedia datastream into a corresponding transcoded IDU that is stored in a new data sector, wherein the corresponding transcoded IDU has a format that differs from a format of the IDU;

changing a pointer of a data sector that stores a preceding transcoded IDU to the corresponding transcoded IDU to point to the new data sector and changing a pointer of the new data sector to point to a data sector storing a subsequent IDU to the IDU; and playing the preceding transcoded IDU, the corresponding transcoded IDU, and the subsequent IDU in sequence using pointers in the corresponding data sectors.

19. A method as recited in claim 18, wherein the playing includes compensating for a momentary glitch between the corresponding transcoded IDU and the subsequent IDU.

20. A method as recited in claim 18, wherein the playing includes momentarily holding a presentation of the corresponding transcoded IDU for a transition between the corresponding transcoded IDU and the subsequent IDU.

* * * * *